United States Patent
An et al.

(10) Patent No.: US 10,218,629 B1
(45) Date of Patent: Feb. 26, 2019

(54) MOVING PACKET FLOWS BETWEEN NETWORK PATHS

(71) Applicant: Juniper Networks, Inc., Sunnyvale, CA (US)

(72) Inventors: Yafan An, Fremont, CA (US); Jeffrey Pochop, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 199 days.

(21) Appl. No.: 14/581,998

(22) Filed: Dec. 23, 2014

(51) Int. Cl.
| | |
|---|---|
| *H04Q 11/00* | (2006.01) |
| *H04L 12/841* | (2013.01) |
| *H04L 12/707* | (2013.01) |
| *H04L 12/721* | (2013.01) |

(52) U.S. Cl.
CPC ............ *H04L 47/283* (2013.01); *H04L 45/22* (2013.01); *H04L 45/70* (2013.01)

(58) Field of Classification Search
CPC ..... H04L 12/721; H04L 12/26; H04L 12/931; H04L 45/70; H04L 49/70; H04L 49/50; H04L 43/04; H04L 47/29; H04L 47/10; H04L 47/28; H04L 45/00; H04L 45/22; H04L 45/121; H04L 43/0852; H04L 47/125; H04L 45/302; H04L 43/16; H04L 49/25; H04L 45/7453; H04L 69/14; H04L 43/10
USPC .................. 370/216–222, 230–235; 709/223
See application file for complete search history.

(56) References Cited

U.S. PATENT DOCUMENTS

| | | | |
|---|---|---|---|
| 7,701,884 B2 * | 4/2010 | Chapweske | H04L 1/0002 370/235 |
| 7,809,009 B2 | 10/2010 | Tatar et al. | |
| 8,111,685 B2 * | 2/2012 | Perkins | H04J 14/02 370/351 |
| 8,503,304 B2 | 8/2013 | Ferguson et al. | |
| 8,705,366 B2 | 4/2014 | Mekkattuparamban et al. | |
| 8,738,752 B2 | 5/2014 | Charny et al. | |

(Continued)

FOREIGN PATENT DOCUMENTS

WO 2013184846 A1 12/2013

OTHER PUBLICATIONS

An, "Tiers in virtual Chassis Fabric," Juniper Networks, Inc., Oct. 2013, 4 pp.

(Continued)

*Primary Examiner* — Hanh N Nguyen
(74) *Attorney, Agent, or Firm* — Shumaker & Sieffert, P.A.

(57) ABSTRACT

In one example, a network device is configured as a leaf node of an interconnected topology that defines a plurality of network paths from the network device to each of a plurality of other leaf nodes of the interconnected topology. The network device includes one or more processing units configured to forward a first packet of a packet flow along a first network path of the plurality of network paths, after receiving a second packet of the packet flow, determine an inactivity interval for the packet flow that represents an amount of time between receipt of the first packet and receipt of the second packet, compare the inactivity interval to a threshold, and when the inactivity interval is greater than the threshold, forward the second packet along a second network path of the plurality of network paths, wherein the second network path is different than the first network path.

24 Claims, 8 Drawing Sheets

(56) References Cited

U.S. PATENT DOCUMENTS

| | | | | |
|---|---|---|---|---|
| 8,897,130 | B2* | 11/2014 | Matthews | H04L 69/14 370/231 |
| 9,094,308 | B2* | 7/2015 | Ghose | H04L 45/586 |
| 9,154,394 | B2* | 10/2015 | Ko | H04L 43/0858 |
| 9,276,853 | B2* | 3/2016 | Blomquist | H04L 45/7453 |
| 9,485,115 | B2* | 11/2016 | Kapadia | H04L 45/02 |
| 9,917,797 | B2* | 3/2018 | Sigoure | H04L 49/50 |
| 2014/0108489 | A1 | 4/2014 | Glines et al. | |
| 2014/0119193 | A1 | 5/2014 | Anand et al. | |
| 2015/0071108 | A1* | 3/2015 | Lumezanu | H04L 43/106 370/253 |
| 2015/0127797 | A1* | 5/2015 | Attar | H04L 45/38 709/223 |
| 2016/0149788 | A1* | 5/2016 | Zhang | H04L 43/10 709/224 |
| 2016/0182379 | A1* | 6/2016 | Mehra | H04L 47/125 709/223 |

OTHER PUBLICATIONS

"Clos IP Fabrics with QFX5100 Switches: Building Flexible, Programmable Data Center Networks Using Layer 3 Protocols and Overlay Networking," Juniper Networks, Inc., White Paper, Mar. 2014, 25 pp.

"OpenFlow Switch Specification, version 1.1.0 Implemented (Wire Protocol0x02)," OpenFlow Consortium, Feb. 2011, 56 pp.

Alizadeh et al., "Analysis of DCTCP: Stability, Convergence, and Fairness," Department of Electrical Engineering, Standford University, SIGMETRICS'11, Jun. 7-11, 2011, 14 pp.

Benson et al., "Network Traffic Characteristics of Data Centers in the Wild," Microsoft Research-Redmund, University of Wisconsin-Madison, IMC'10, Nov. 1-3, 2010, 14 pp.

Alizadeh et al., "Data Center TCP (DCTCP)," Microsoft Research, Standford University, SIGCOMM'10, Aug. 30-Sep. 3, 2010, 12 pp.

Kandula et al., "Dynamic Load Balancing Without Packet Reordering," ACM SIGCOMM Computer Communication Review, vol. 37, No. 2, Apr. 2007, 10 pp.

Sinha et al., "Harnessing TCP's Burstiness with Flowlet Switching," Proc. 3rd ACM Workshop on Hot Topics in Networks (Hotnets-III), Nov. 15, 2004, 6 pp.

Kandula et al., "The Nature of Datacenter Traffic: Measurements & Analysis," Microsoft Research, IMC'09, ACM, Nov. 4-6, 2009, 7 pp.

Dixit et al., "On the Impact of Packet Spraying in Data Center Networks," Purdue University, INFOCOM, 2013 Proceedings IEEE, Apr. 14, 2013, 9 pp.

Casado et al., "Tales of the network reformation—Of Mice and Elephants," Network Heresy, WordPress.com, posted on Nov. 1, 2013, 7 pp.

Ford et al., "TCP Extensions for Multipath Operation with Multiple Addresses," RFC 6824, Internet Engineering Task Force (IETF), Jan. 2013, 64 pp.

"IEEE Std 802.15.1, Part 15.1: Wireless medium access control (MAC) and physical layer (PHY) specifications for wireless personal area networks (WPANs)," IEEE Standards Association, Revision of IEEE Std. 802.15.1-2002; Jun. 14, 2005, 600 pp.

"IEEE Std 802.1 BR—IEEE Standard for Local and metropolitan area networks—Virtual Bridged Local Area Networks—Bridge Port Extension," IEEE Standards Association, IEEE Computer Society, Jul. 16, 2012, 164 pp.

"IEEE Std 802.11-2012, Part 11: Wireless LAN Medium Access Control (MAC) and Physical Layer (PHY) Specifications," IEEE Standards Association, Mar. 29, 2012, 2793 pp.

* cited by examiner

MOVING PACKET FLOWS BETWEEN NETWORK PATHS

TECHNICAL FIELD

This disclosure relates to computer networks.

BACKGROUND

In a typical cloud-based data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Packet flows in a data center are often made up of one or more "flowlets," where one flowlet is a burst of packets sent in rapid succession, and the flowlets may be separated by relatively long periods of time with no traffic for the packet flow. Accordingly, when a packet flow is originally assigned to a path through the switch fabric, the path may appear to have a low utilization only because the time at which the utilization of the path is measured represents a time between flowlets of a corresponding packet flow. Thus, if a new packet flow is assigned to the same path, and if flowlets of the two packet flows occur at the same time, the bandwidth for the path may be exceeded, resulting in dropped packets.

SUMMARY

In general, this disclosure describes techniques for moving a packet flow between network paths while preventing packet reordering. Moving packet flows may allow for greater network traffic throughput than if the packet flows were statically assigned. That is, rather than forwarding packets of flowlets of two paths along the same path (which may exceed the path's bandwidth), one of the two packet flows may be moved to a different path with lower utilization, thus allowing flowlets of both packet flows to be forwarded without resulting in dropped packets.

The techniques of this disclosure may be used when an interconnected topology of network devices defines a plurality of available network paths, e.g., as used in a switch fabric of a data center. For instance, the interconnected topology may correspond to a spine and leaf topology with chassis switches acting as the spines and top-of-rack (TOR) switches acting as the leaves. Alternatively, the interconnected topology may correspond to a Clos network, a virtual chassis fabric (VCF), an Internet protocol (IP) Fabric, a network according to IEEE 802.1BR, or other such networks.

The techniques of this disclosure are in recognition that if a latency skew (that is, a difference in latencies) between two network paths is less than a time between packets of a packet flow, then the later packet of the packet flow can be sent along the new path and will arrive later than the previous packet of the packet flow that was sent along the previous path. Therefore, when an inactivity interval (that is, a time between the packets of the packet flow) is greater than the latency skew, the packet flow can be moved to the new path, if such a move is desirable. For instance, such a move may be desirable if the new path is less utilized than the current path. Accordingly, network devices (e.g., leaf nodes) of interconnected topologies may be configured to move a packet flow from one path to another when an inactivity interval for the packet flow is greater than a latency skew between the paths, assuming the new path has a lower utilization than the current path.

In one example, a method includes forwarding, by a network device comprising a leaf node of an interconnected topology having a plurality of network paths from the network device to each of a plurality of other leaf nodes of the interconnected topology, a first packet of a packet flow along a first network path of the plurality of network paths, in response to receiving a second packet of the packet flow, determining, by the network device, an inactivity interval for the packet flow that represents an amount of time between receipt of the first packet and receipt of the second packet by the network device during which no other packets were received for the packet flow, comparing the inactivity interval to a threshold, wherein the threshold is configured based on a latency difference between the first network path and the second network path, and when the inactivity interval is greater than the threshold, forwarding the second packet along a second network path of the plurality of network paths, wherein the second network path is different than the first network path.

In another example, a network device is configured as a leaf node of an interconnected topology having a plurality of network paths from the network device to each of a plurality of other leaf nodes of the interconnected topology. The network device includes a plurality of physical ports each coupled to a respective one of the plurality of network paths. The network device also includes one or more processing units configured to forward a first packet of a packet flow along a first network path of the plurality of network paths via a respective one of the physical ports, in response to receiving a second packet of the packet flow, determine an inactivity interval for the packet flow that represents an amount of time between receipt of the first packet and receipt of the second packet by the network device during which no other packets were received for the packet flow, compare the inactivity interval to a threshold, wherein the threshold is configured based on a latency difference between the first network path and the second network path, and when the inactivity interval is greater than the threshold, forward the second packet along a second network path of the plurality of network paths via a respective one of the physical ports, wherein the second network path is different than the first network path.

In another example, a system includes a plurality of network devices arranged according to an interconnected topology having a plurality of network paths between the network devices and a virtual network controller to provide configuration to the network devices. One of the network devices is configured to forward a first packet of a packet flow along a first network path of the plurality of network paths, in response to receiving a second packet of the packet flow, determine an inactivity interval for the packet flow that represents an amount of time between receipt of the first packet and receipt of the second packet by the network device during which no other packets were received for the packet flow, compare the inactivity interval to a threshold, wherein the threshold is configured based on a latency difference between the first network path and the second network path, and when the inactivity interval is greater than the threshold, forward the second packet along a second network path of the plurality of network paths, wherein the second network path is different than the first network path.

In another example, a computer-readable medium, such as a computer-readable storage medium, contains, e.g., is encoded with, instructions that, when executed, cause a processor of a network device comprising a leaf node of an interconnected topology having a plurality of network paths from the network device to each of a plurality of other leaf nodes of the interconnected topology to forward a first packet of a packet flow along a first network path of the plurality of network paths, in response to receiving a second packet of the packet flow, determine an inactivity interval for the packet flow that represents an amount of time between receipt of the first packet and receipt of the second packet by the network device during which no other packets were received for the packet flow, compare the inactivity interval to a threshold, wherein the threshold is configured based on a latency difference between the first network path and the second network path, and when the inactivity interval is greater than the threshold, forward the second packet along a second network path of the plurality of network paths, wherein the second network path is different than the first network path.

In another example, a method includes storing, with a controller of a data center, respective topology information for a plurality of leaf node switches interconnected within the data center by one or more centralized switches to form a plurality of paths from each of the leaf node switches to each of the other leaf node switches, for each of the leaf node switches: identifying pairwise permutations of the plurality of paths for which a first path and a second path both originate from the leaf node switches and lead to other ones of the leaf node switches, computing, with the controller and for each of the pairwise permutations, a respective threshold for an inactivity interval for controlling reassignment of a packet flow from the first path to the second path of the pairwise permutation, wherein the threshold is calculated based on a latency difference between the first path and the second path of the pairwise permutation, and outputting configuration information to the respective leaf node, the configuration information specifying the thresholds computed by the controller for each of the pairwise permutation of the paths originating from the leaf node.

The details of one or more examples are set forth in the accompanying drawings and the description below. Other features, objects, and advantages will be apparent from the description and drawings, and from the claims.

DETAILED DESCRIPTION

Figure 1A:
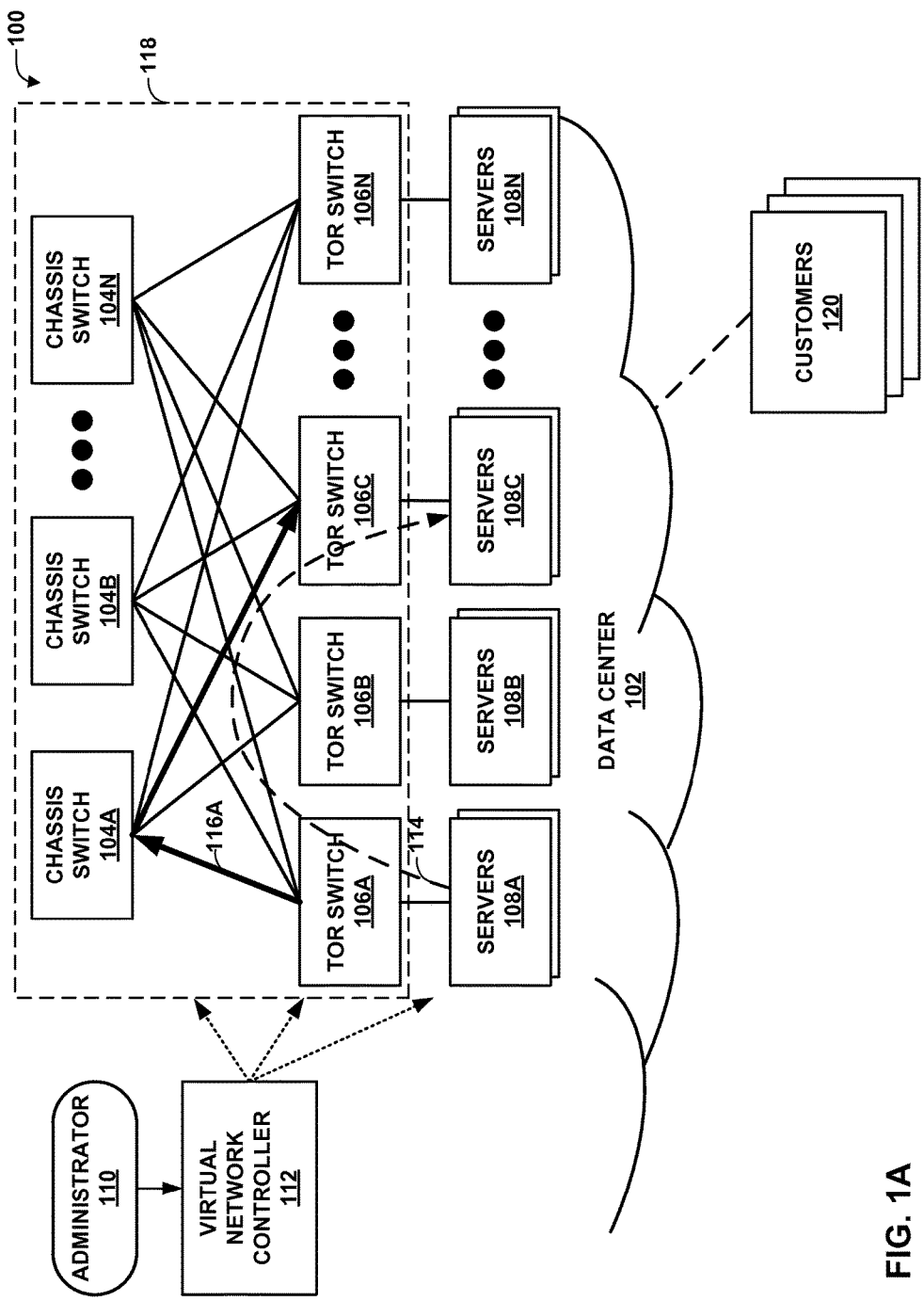
FIGS. 1A and 1B are block diagrams illustrating an example network including a data center in which examples of the techniques described herein may be implemented.
Figure 1B:
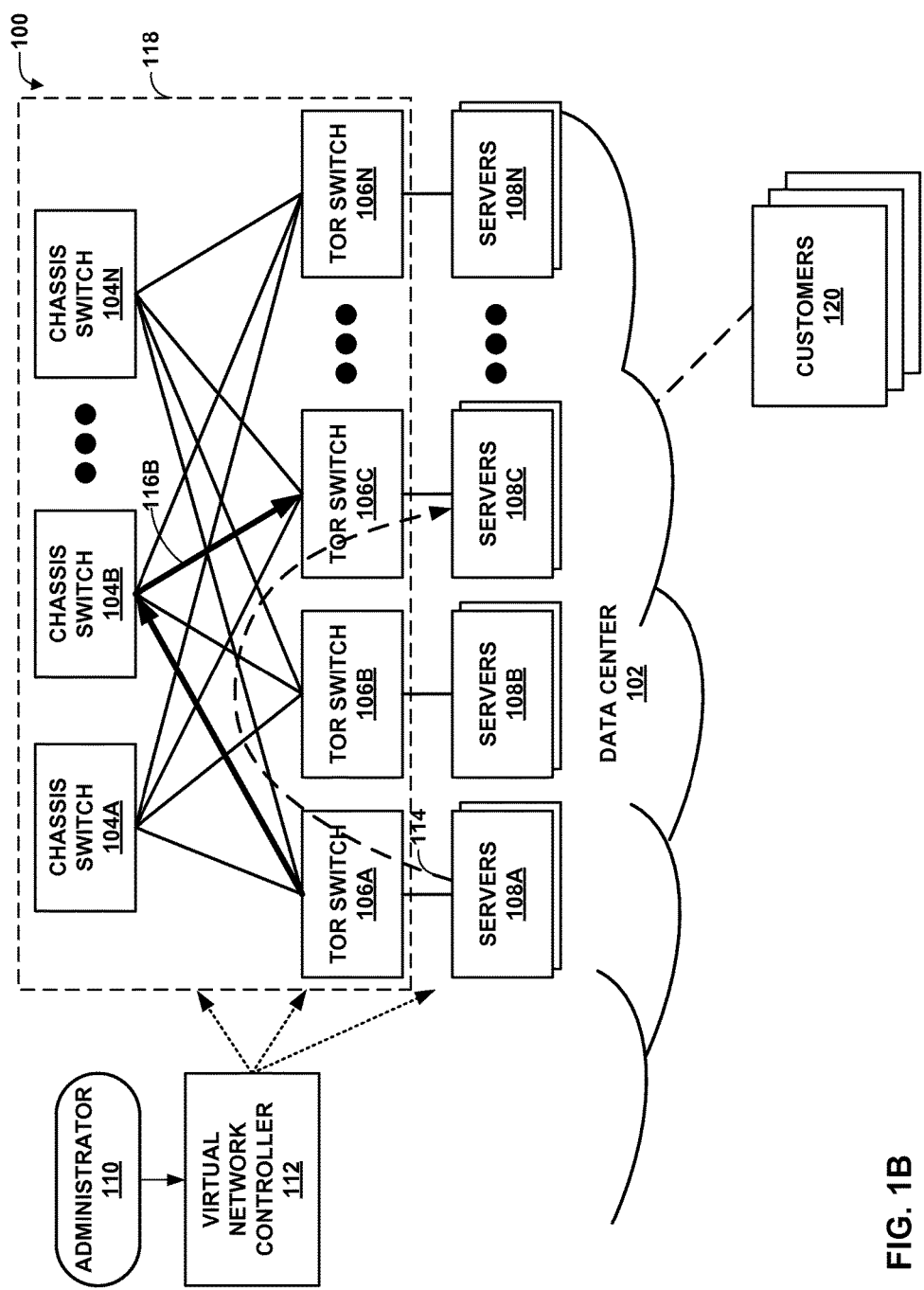

FIGS. 1A and 1B are block diagrams illustrating an example network 100 including a data center 102 in which examples of the techniques described herein may be implemented. In general, data center 102 provides an operating environment for applications and services for customers 120 coupled to the data center, e.g., by a service provider network (not shown). Data center 102 may, for example, host infrastructure equipment, such as networking and storage systems, redundant power supplies, and environmental controls. A service provider network that couples customers 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the examples of FIGS. 1A and 1B, data center 102 may be a facility that provides network services for customers 120. Customers 120 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 102 may be individual network servers, network peers, or otherwise.

In this example, data center 102 includes a set of storage systems and application servers 108A-108N (servers 108) interconnected via interconnected topology 118, which may comprise a switch fabric provided by one or more tiers of physical network switches and routers. In the examples of FIGS. 1A and 1B, interconnected topology 118 includes chassis switches 104A-104N (chassis switches 104) and top-of-rack (TOR) switches 106A-106N (TOR switches 106). For instance, chassis switches 104 may form spine nodes of a spine and leaf topology, while TOR switches 106 may form leaf nodes of the spine and leaf topology. It should be understood that other topologies may be used in other examples, as discussed in greater detail below. Servers 108 provide execution and storage environments for applications and data associated with customers 120 and may be physical servers, virtual machines or combinations thereof.

In general, interconnected topology 118 represents layer two (L2) and (in some examples) layer three (L3) switching and routing components that provide point-to-point connectivity between servers 108. In one example, interconnected topology 118 comprises a set of interconnected, high-performance yet off-the-shelf packet-based routers and switches that implement industry standard protocols. In one example, interconnected topology 118 may comprise off-the-shelf components that provide Internet Protocol (IP) over an Ethernet (IPoE) point-to-point connectivity.

In FIGS. 1A and 1B, virtual network controller 112 provides a high-level controller for configuring and managing routing and switching infrastructure of data center 102. Virtual network controller 112 may represent, for example, a software defined network (SDN) controller that communicates and manages the devices of data center 102 using an SDN protocol, such as the OpenFlow protocol. Additional details regarding OpenFlow are found in "OpenFlow Switch Specification version 1.1.0", OpenFlow Consortium, February 2011, which is incorporated by reference herein. In addition, controller 112 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Virtual network controller 112 provides a logically—and in some cases, physically—centralized controller for facilitating operation of one or more virtual networks within data center 102 in accordance with examples of this disclosure. In some examples, virtual network controller 112 may operate in response to configuration input received from network administrator 24. Additional information regarding virtual network controller 112 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within interconnected topology 118, such as packet flows between servers 108, can traverse the physical network of interconnected topology 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As shown in the examples of FIGS. 1A and 1B, each of TOR switches 106 is communicatively coupled to each of chassis switches 104 in interconnected topology 118. Similarly, in this example, each of chassis switches 104 is communicatively coupled to each of TOR switches 106. Accordingly, the number of paths from any one of TOR switches 106 to any other one of TOR switches 106 is equal to the number of chassis switches 104, in this example. Although the letter "N" is used to represent undefined numbers of both TOR switches 106 and chassis switches 104, it should be understood that there may be a different of TOR switches 106 than chassis switches 104.

In the examples of FIGS. 1A and 1B, interconnected topology 118 allows for multi-path forwarding. Multi-path forwarding has been deployed in various levels and scales of networks as a way to increase network capacity and resiliency. Developments have been made to multi-path systems to determine how to achieve balanced redistribution of traffic among the multiple paths and how to avoid packet reordering while packets are travelling on the different paths. TOR switches 106 may utilize hash tables to prevent packet reordering for a particular flow, as described in greater detail below. In general, to prevent packet reordering, once a flow is assigned to a path through interconnected topology 118, all packets of the flow are sent along the same path. However, as also discussed in greater detail below, the techniques of this disclosure include moving a flow from one path to another through interconnected topology 118 while also preventing packet reordering.

Flows include one or more flowlets. Flowlets represent a small burst of packets (or PDUs) in a flow. The techniques of this disclosure include utilization of flowlets to enable improved load balancing. One established reason for the existence of flowlets is that TCP transmission is controlled by a window and servers (that is, devices that send data) can finish sending the maximum allowed bytes before they receive acknowledgements (ACKs) for previously sent data. A flow can also be classified based on whether the flow is disproportionately larger than most other flows. Recognition that some flows are larger than others has led to the characterization of flows that are disproportionately large as "elephant" flows, and the other, smaller flows as "mice" flows.

"Elephant" flows generally consume more network resources than "mice" flows. Furthermore, because flows include flowlets, a network path to which an "elephant" flow is assigned may appear to be under-utilized until a flowlet of the "elephant" flow is transmitted, at which point a tremendous amount of bandwidth of the path may be used in transmitting data of the flowlet. Conventional wisdom for addressing this "elephant" and "mice" problem points to an "identification and steering" solution. That is, first the "elephant" flows are identified and then different forwarding or steering policies are applied to these "elephant" flows. While the approach described in this disclosure is primarily aimed at achieving a balanced distribution of traffic, it also alleviates the "elephant" and "mice" problem as a side effect.

This disclosure describes techniques that are based on the observation that an "elephant" flow can be divided into a plurality of short bursts, which are called flowlets in this disclosure. In accordance with these techniques, flowlets of a single flow can be assigned to different network paths during the lifetime of the single flow. Furthermore, in these techniques, flow reassignment (which is based on flowlets) is done in a way to avoid packet re-ordering. To be able to adapt to uneven sizes of flows, this disclosure describes techniques for frequently measuring link loads and queue depths, which may be used in determining link assignment for packet flows. Furthermore, to reduce the chance of hash-collision, an indirect hash table may be used so that each hashed entry can be independently assigned to a link. The techniques of this disclosure may allow for Adaptive Load Balancing (ALB) based on an Adaptive Flowlet Splicing mechanism.

This disclosure recognizes that prominent (that is, "elephant") flows tend to be TCP flows, due to TCP windowing. There have been various mechanisms, such as selective acknowledgements (SACK) and window shifting, which change the TCP windowing effect. Nevertheless, TCP's burstiness remains prominent at the round-trip time (RTT) scales and even sub-RTT scales. The higher speed ports on newer servers, as in modern data centers, make TCP's burstiness even more pronounced.

Conventional solutions to the "elephant" and "mice" problem include techniques that disregard packet reordering (such as round-robin techniques or randomized spraying techniques) and techniques that introduce occasional packet reordering (such as sampling, flow tracking, and the like). Packet re-ordering during transmission creates a problem that needs to be solved, either by the network or by the end stations, and the solution is not going to be cost-free. The techniques of this disclosure, however, include an approach that enables in-order packet delivery.

Regardless of how flowlets are created, as long as flowlets exist, they provide natural delineation points for splitting elephant flows apart for achieving better load balancing while, at the same time, guaranteeing in-order delivery of packets. The requirement of in-order delivery is only from the start of a multi-path to the end of the same multi-path (that is, through interconnected topology 118). If a flow's path switch happens in-between flowlets and the inactive interval between flowlets are longer than the latency skew (that is, the difference between latencies of the paths involved in the path switch) of the multi-path, the path-switching will not cause packet re-ordering.

In accordance with the techniques of this disclosure, flows may be moved from one path to another at certain times. For example, a flow between TOR switch 106A to TOR switch 106C may be moved from a path including chassis switch 104A to chassis switch 104B. In particular, reassignment of packet flows to different paths may occur on a flowlet basis. Such reassignment may be referred to as "splicing" the packet flow.

TOR switches 106 maintain hash tables that include information representing which flows are assigned to which links throughout interconnected topology 118. That is, when a flow is assigned to a path from one of TOR switches 106 to another one of TOR switches 106 through interconnected topology 118, the origin TOR switch may add the flow to a hash table. A hash table includes a set of buckets, each of which includes one or more cells that contain the identifying information and data identifying the path. A hash function maps the input (that is, identifying information for a packet flow, such as the network five-tuple) to a bucket in the hash table. TOR switches 106, such as TOR switch 106A, store the identifying information for the packet flow and the identifying information for the path to which the flow is assigned to the bucket.

TOR switches 106 store timestamps in buckets of hash tables that correspond to packet flows. The timestamp represents a time of activity (e.g., a received packet) for the corresponding packet flow. Thus, when a subsequent packet of the packet flow is received, TOR switches 106 (e.g., TOR switch 106A) calculates a difference between the timestamp stored in the bucket for the packet flow and a current time. This difference represents an inactivity interval for the packet flow. That is, the inactivity interval represents an amount of time between receipt of the previous packet and the subsequent packet during which no other packets of the packet flow were received. In accordance with the techniques of this disclosure, if the inactivity interval is greater than a threshold (e.g., a latency skew, as described in greater detail below), the packet flow can be moved from one path to another through interconnected topology 118 without causing reordering.

FIGS. 1A and 1B illustrate an example in which a packet flow is reassigned from one path to another. In particular, the example of FIG. 1A illustrates packet flow 114 between one of servers 108A and one of servers 108B. Packet flow 114 traverses interconnected topology 118, using TOR switch 106A as an ingress and TOR switch 106C as an egress. In the example of FIG. 1A, packet flow 114 is initially assigned to path 116A, including chassis switch 104A. However, in accordance with the techniques of this disclosure, packet flow 114 may be reassigned to a different path through interconnected topology 118. For example, as shown in FIG. 1B, packet flow 114 may be reassigned to path 116B, which includes chassis switch 104B.

Each of the various paths through interconnected topology 118 has a respective latency, which results from workloads of the various devices (chassis switches 104 and TOR switches 106) along the path. Thus, if a time between packets of a packet flow, e.g., packet flow 114, exceeds the latency skew (that is, the difference between latencies for the current path and a new, different path), it can safely be assumed that packet reordering will not occur if the packet flow is reassigned to the new path. This is because all packets of the flow (in particular, the most recent flowlet) sent along that path will either have already reached their destination or will reach their destination before data sent along the new path.

In this manner, TOR switches 106, according to the techniques of this disclosure, may split a packet flow that is assigned to a current path through interconnected topology 118 such that packets are sent over a new path through interconnected topology 118 when a latency skew between the current path and the new path is less than an inactivity interval, that is, a temporal gap between packets of the packet flow. The temporal gap represents the time between receipts of two packets of the packet flow without any intervening packets of the packet flow. After reassigning the packet flow to a new path, TOR switches 106 update the data of the corresponding bucket in the hash table, as well as the timestamp.

Although the determination of whether the inactivity interval is greater than the latency skew represents a time when such a split can occur, the split need not necessarily take place in this instance. In particular, TOR switches 106 may be configured to perform the split when utilization of the current path is greater than utilization of the new path. The utilization may be determined, for example, based on an amount of data being sent along links to chassis switches 104 from the current one of TOR switches 106 for the two paths (the current path and the new path). For example, assuming the current path is path 116A and the new path is path 116B, TOR switch 106A may compare the available bandwidth for the link from TOR switch 106A to chassis switch 104A to the available bandwidth for the link from TOR switch 106A to chassis switch 104B. Then, if the available bandwidth for the link from TOR switch 106A to chassis switch 104B is greater and if the time since the last packet of the packet flow is greater than the latency skew between path 116A and path 116B, TOR switch 106A may send the next packet along path 116B to reach TOR switch 106C.

More particularly, TOR switches 106 may be configured with information defining latency skews between each pairwise permutation of paths from themselves to each of the other TOR switches 106. That is, assuming that a packet flow is assigned to a given path of N paths (where N is equal to the number of chassis switches 104, in this instance), there are N−1 possible alternative paths to the same endpoint TOR switch. Accordingly, TOR switches 106 are configured with information defining each pairwise permutation of paths to each other one of TOR switches 106. Accordingly, after receiving a packet of a packet flow, one of TOR switches 106 may determine whether any of the other paths has a lower utilization than the current path. If multiple alternative paths exist that have lower utilization, the TOR switch may first determine whether the inactivity interval is greater than the latency skew from the current path to the alternative path with the lowest interval, and if not, iterate through each of the paths having lower utilization than the current path (in order of utilization) until all possible alternative paths are exhausted or an alternative path is discovered for which the inactivity interval is greater than the latency skew relative to the current path.

Interconnected topology 118 may be implemented in various ways, and does not necessarily include the devices or arrangement shown in FIGS. 1A and 1B. In one example, interconnected topology 118 is implemented as a spine and leaf topology. In such an example, chassis switches 104 are configured as spine switches (e.g., Layer 3 switches) and TOR switches 106 are configured as leaf switches.

Figure 2:
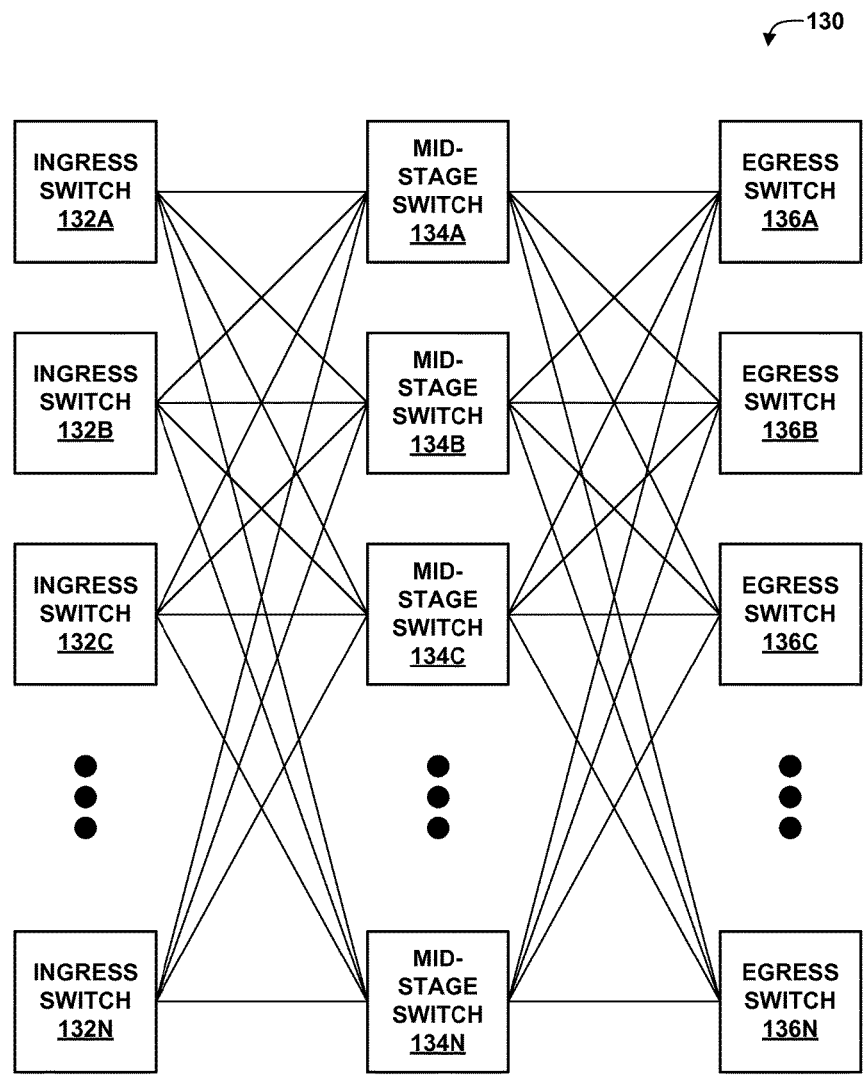
FIG. 2 is a block diagram illustrating an example Clos network, which is an example of an interconnected topology.

In another example, interconnected topology 118 is implemented as a Clos network with three or more stages. A spine and leaf network is functionally similar to a three-stage Clos network, and therefore, spine and leaf networks are sometimes referred to as folded three-stage Clos networks. In general, Clos networks include three or more stages: an ingress stage, one or more mid-stages, and an egress stage. Nodes of each stage are connected to each node of each neighboring stage. For example, each node of the ingress stage is connected to each node of the first mid-stage, and each node of the last mid-stage (which is also the first mid-stage in a three-stage Clos network) is connected to each node of the egress stage. An example Clos network is shown in FIG. 2, as discussed in greater detail below.

In another example, interconnected topology 118 is implemented as a Virtual Chassis Fabric (VCF), e.g., as explained in Yafan An, "Tiers in Virtual Chassis Fabric," Oct. 30, 2013, available at http://forums.juniper.net/t5/Data-Center-Technologists/Tiers-in-Virtual-Chassis-Fabric/ba-p/214765. A VCF allows interconnected topology 118 to be managed as a single device, e.g., by virtual network controller 112. One example VCF implementation may be realized using four QFX5100-24Q switches from Juniper Networks, Inc., Sunnyvale, Calif. as spine switches and sixteen QFX5100-48S switches from Juniper Networks, Inc., Sunnyvale, Calif. as leaf switches. In this example, the spine switches support 48×10 Gigabit Ethernet (GbE) and 6×40 GbE interfaces, while each leaf uses 4×40 GbE interfaces as uplinks to the spine switches. This creates an oversubscription of 480:160 or 3:1 per leaf, in this example. Each leaf supports 48×10 GbE interfaces, such that the total port count is 768×10 GbE with 3:1 oversubscription.

In a VCF built with QFX-5100 switches in a spine and leaf topology, the fabric latency for unicast traffic is three hops. In heuristic testing, minimum and maximum latency are roughly 2 and 5 microseconds, respectively. Thus, the latency skew is around 3 micro seconds. Hence an inactivity interval threshold of bigger than three micro seconds will be able to avoid packet re-ordering regardless which path a flowlet takes inside the VCF. Such a short interval provides plenty of opportunities for the VCF to spray flowlets to different paths within the fabric, hence it can achieve much more accurate load distribution. Furthermore, "elephant" flowlets may be split between multiple spine switches.

In another example, interconnected topology 118 is implemented as an Internet protocol (IP) Fabric. An IP Fabric is made up of routing devices implementing Border Gateway Protocol (BGP), and each of the routing devices is a BGP neighbor to each of the other devices in the IP Fabric. An example IP Fabric can be formed from four Juniper Networks QFX5100-24Q switches as spine switches and QFX5100-96S switches, available from Juniper Networks, Inc., Sunnyvale, Calif., as leaf switches. Such an arrangement results in an IP Fabric of 3072×10 GbE usable ports. The leaves are constructed using the QFX5100-96S, and 8×40 GbE interfaces are used as uplinks into the spine, in this example. Because each leaf has eight uplinks into the spine, the maximum width of the spine is eight in this example. Each 40 GbE interface per leaf connects to a separate spine—thus, each leaf consumes one 40 GbE interface per spine. To calculate the maximum size of the IP Fabric, the number of server interfaces is multiplied by the number of leaves supported by the spine.

In yet another example, rather than interconnected topology 118 of FIGS. 1A and 1B, servers 108 may be connected by an interconnected topology according to IEEE 802.1BR. In accordance with IEE 802.1BR, interconnected topology 118 may instead only include two spine switches, multiple leaf nodes, and two or more satellite switches, such that there are two or more paths from any satellite switch to any other satellite switch. For example, in accordance with IEEE 802.1BR, there may be two controlling bridges in the position of chassis switches 104 and a plurality of port extenders in the position of TOR switches 106, interconnected as shown in interconnected topology 118.

FIG. 2 is a block diagram illustrating an example Clos network 130. Clos network 130, or a similar Clos network, may be used in place of interconnected topology 118 of FIGS. 1A and 1B. Clos network 130 includes three stages of switches: ingress switches 132A-132N (ingress switches 132), mid-stage switches 134A-134N (mid-stage switches 134), and egress switches 136A-136N (egress switches 136). Although the letter "N" is used to designate a variable number for each of ingress switches 132, mid-stage switches 134, and egress switches 136, it should be understood that the number of switches included in each stage is not necessarily the same. That is, there may be different numbers of ingress switches 132, mid-stage switches 134, and egress switches 136. Furthermore, although Clos network 130 includes three stages, it should be understood that a general Clos network may include any number of stages.

Figure 3:
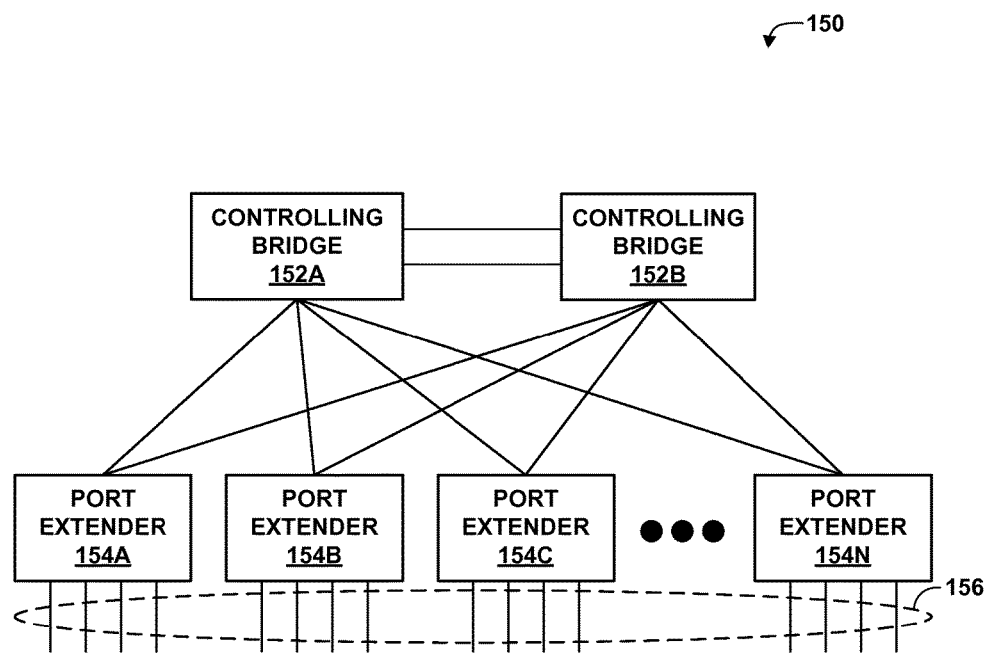
FIG. 3 is a block diagram illustrating an example IEEE 802.1BR network with a multi-chassis link aggregation group (LAG) for resilient multi-pathing.

FIG. 3 is a block diagram illustrating an example IEEE 802.1BR network 150 with a multi-chassis link aggregation group (LAG) for resilient multi-pathing. Network 150 may be used in place of interconnected topology 118 of FIGS. 1A and 1B. Network 150 includes two controlling bridges 150, which are coupled to each other and to a plurality of port extender devices 154A-154N (port extenders 154). Network 150 provides extended ports 156. That is, each of port extenders 154 includes a plurality of ports. Although four ports are shown in FIG. 3, it should be understood that each of port extenders 154 may have any number of ports.

Figure 4:
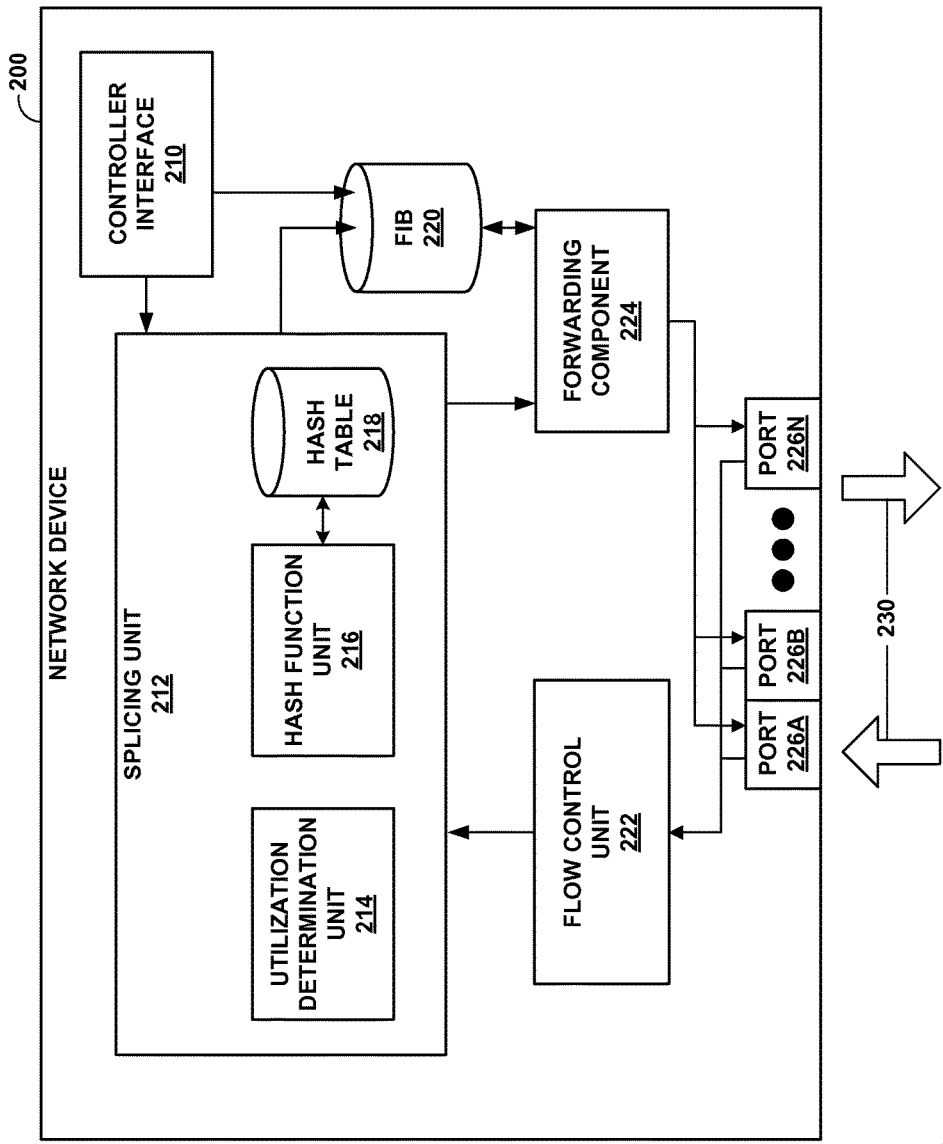
FIG. 4 is a block diagram illustrating an example network device that may implement the techniques of this disclosure.

FIG. 4 is a block diagram illustrating an example network device 200. Network device 200 may correspond to, for example, TOR switch 102A. In accordance with the techniques of this disclosure, network device 200 includes splicing unit 212, which generally determines whether to transfer a packet flow from one path to another through an interconnected topology, such as interconnected topology 118 of FIGS. 1A and 1B. Although in this example splicing unit 212 forms part of network device 200, it should be understood that in other examples, the functionality attributed to splicing unit 212 may be implemented in a separate device, e.g., virtual network controller 112.

In the example of FIG. 4, network device 200 also includes controller interface 210, forwarding information base (FIB) 220, flow control unit 222, forwarding component 224, and physical ports 226A-226N (ports 226). Controller interface 210 acts as an interface to virtual network controller 112. Virtual network controller 112 may provide configuration data to network device 200 via controller interface 210. For example, network device 200 may receive a value defining network latency skews between various paths through the interconnected topology from virtual network controller 112 via controller interface 210. As another example, the received configuration data may define physical ports 226 of network device 200 and devices of the interconnected topology (e.g., chassis switches 104) to which the physical ports are connected.

FIB 220 generally stores information that maps packets to physical ports (not shown) of network device 200. FIB 220 may be configured by network device 200 and/or virtual network controller 112. Network device 200 also includes flow control unit 222. In the example of FIG. 4, flow control unit 222 receives packets of a packet flow, such as packet flow 230, via one of ports 226. After receiving a packet, flow control unit 222 sends the packet to splicing unit 212.

Splicing unit 212 includes utilization determination unit 214, hash function unit 216, and hash table 218. After receiving a packet, splicing unit 212 determines a path along which to forward the packet. More particularly, in accordance with the techniques of this disclosure, if the packet is of an established packet flow that has already been assigned to a path through the interconnected topology, splicing unit 212 determines whether the packet flow for the packet should be spliced, that is, sent along a different network path through the interconnected topology than the current path to which the packet flow is currently assigned.

In the case that the packet is the ordinal first packet of a new packet flow, utilization determination unit 214 may determine a path through the interconnected topology that has relatively low load and queue depth (that is, a path with relatively low congestion), and splicing unit 212 assigns the packet flow to the determined path. That is, splicing unit 212 executes hash function unit 216 using identifying information for the packet flow as input, which identifies a bucket of hash table 218. Splicing unit 212 then stores identifying information for the packet flow (e.g., the network five-tuple) and the path to which the packet is assigned, as well as a timestamp value representing a time the packet was received, in the determined bucket of hash table 218. Splicing unit 212 (or another unit of network device 220) may update FIB 220 to indicate the one of ports 226 by which packets of the packet flow are to be forwarded. Splicing unit 212 then provides the packet to forwarding component 224, which forwards the packet via one of ports 226 that corresponds to the determined path, as indicated by FIB 220.

In the case that the packet is of an established packet flow, splicing unit 212 determines whether to splice the packet flow. For instance, utilization determination unit 214 may determine whether the path to which the packet flow is assigned has a relatively high utilization compared to other paths. If so, splicing unit 212 determines whether an inactivity interval for the packet flow exceeds a threshold. In this manner, splicing unit 212 may assign a packet flow to a path based on quality of the path, which may represent a moving average of the path's load and queue depth. The threshold may correspond to, for example, a latency skew relative to another path that has relatively low utilization. The latency skews may be configured by an administrator, by virtual network controller 112 via controller interface 210, or determined by network device 200.

Splicing unit 212 calculates the inactivity interval by subtracting the timestamp for the packet flow from the time at which the packet was received. Splicing unit 212 also updates the timestamp after each packet of the packet flow is received in the bucket of hash table 218. Thus, the inactivity interval represents a temporal gap between the previous packet for the packet flow and the current packet.

In the case that the inactivity interval exceeds the latency skew, the packet flow can be spliced without causing packet reordering. Accordingly, splicing unit 212 updates the bucket for the packet flow in hash table 218 to indicate the new path through the interconnected topology. In addition, splicing unit 212 may also update FIB 220 to cause forwarding component 224 to forward the packet through the one of ports 226 corresponding to the new path, as indicated by FIB 220. Splicing unit 212 also provides the packet to forwarding component 224, which forwards the packet according to FIB 220 through one of ports 226.

As noted above, hash table 218 stores information for packet flows in buckets identified by hash function 216. In some examples, network device 200 uses a plurality of fabric interface bundles. In these examples, each bundle is allocated to a region in hash table 218. Furthermore, hash function unit 216 may use an identifier for the bundle to which the packet flow is mapped as an additional input to determine a bucket of hash table 218 for the packet flow. The region for each bundle in hash table 218 may be sized in, e.g., the hundreds or thousands of buckets, or otherwise sized so that collisions of "elephant" flowlets are rare.

Splicing unit 212 and the various components thereof may be implemented in various ways. For example, the functionality attributed to splicing unit 212 may be implemented in hardware, software, and/or firmware. It should be understood that when implemented in software or firmware, requisite hardware would also be provided, e.g., a memory to store instructions for the software/firmware and one or more processors to execute the instructions. In general, a "processor" refers to any of a variety of processing units or processing circuitry, such as a microprocessor, an application-specific integrated circuit (ASIC), a digital signal processor (DSP), a field programmable gate array (FPGA), or the like. When implemented in hardware, the functionality of splicing unit 212 may be implemented in a single processor or any combination of various types of processors.

Figure 5:
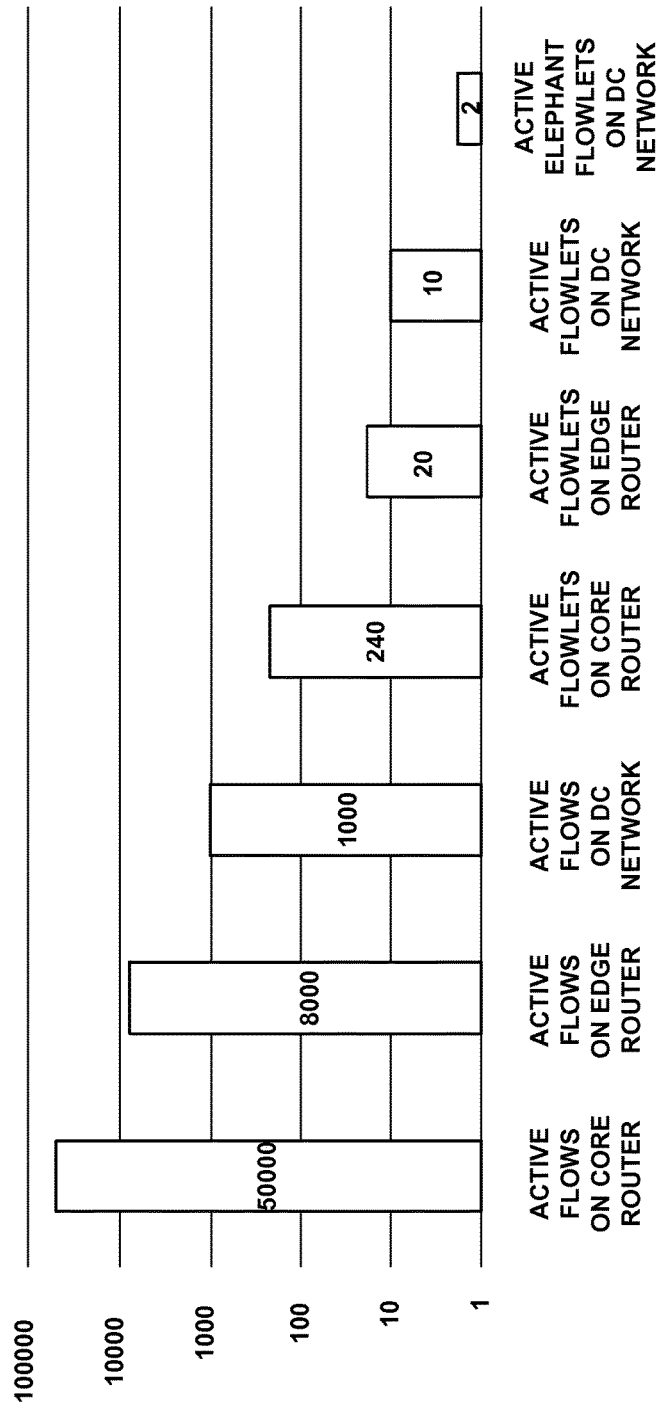
FIG. 5 is a bar graph illustrating a relationship between typical numbers of flows and flowlets in a data center.

FIG. 5 is a bar graph illustrating a relationship between typical numbers of flows and flowlets in a data center. In particular, the graph of FIG. 5 shows that in these tests, there were 50,000 active flows on core routers, 8,000 flows on edge routers, 1,000 active flows on the DC network, 240 active flowlets on the core routers, 20 active flowlets on the edge routers, 10 active flowlets on the DC network, and 2 active elephant flowlets on the DC network. As can be seen, the number of active elephant flowlets is drastically smaller than the number of active flows. As can be seen in the graph, a traditional hash-based load distribution becomes the distribution of a "handful" of "elephant" flows to a "couple" of links, hence frequent hash collisions and packets drops are not a surprise at all.

The techniques of this disclosure may be used to mitigate these collisions. For instance, as discussed above, hash table 218 (FIG. 4) may include hundreds or thousands of buckets in a region into which a "handful" of "elephant" flows are hashed. Thus, a hash collision in hash table 218 is of a low probability. Moreover, since flowlets are short-lived, compared to elephant flows, elephant flowlets represent a small percentage of the time scale. Hence, "elephant" flowlet collision is even less likely. On the other hand, fewer concurrent flowlets indicate that even a reasonable region size (e.g. a few hundred or a thousand) in hash table 218 should be enough to avoid hash collision for "elephant flowlets" in most cases.

Figure 6:
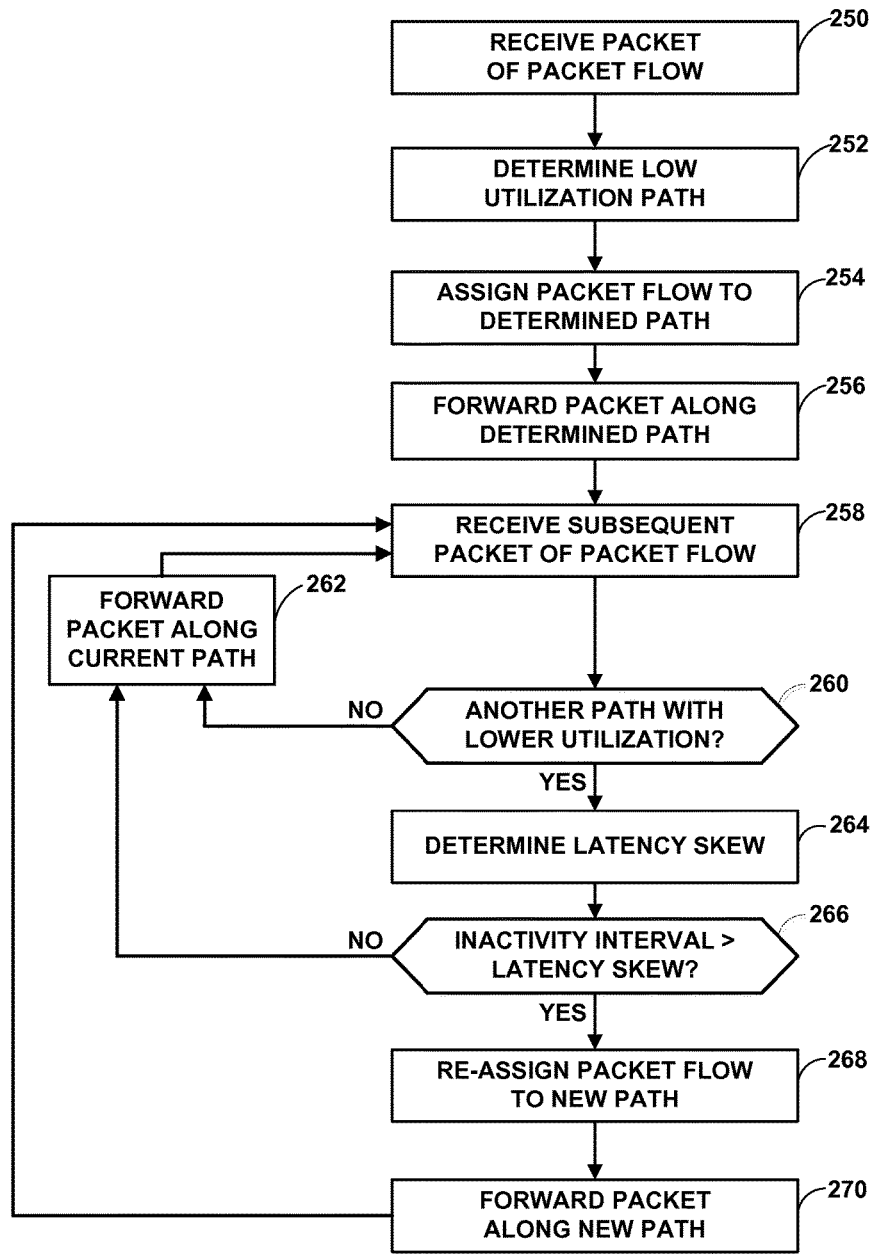
FIG. 6 is a flowchart illustrating an example method for moving a packet flow from one path to another in accordance with the techniques of this disclosure.

FIG. 6 is a flowchart illustrating an example method for moving a packet flow from one path to another in accordance with the techniques of this disclosure. The method of FIG. 6 is explained, for purposes of example, with respect to network device 200 (FIG. 4). However, it should be understood that other devices may be configured to perform all or parts of the method of FIG. 6. For example, virtual network controller 112 (FIGS. 1A and 1B) may perform portions of the method of FIG. 6 (e.g., related to determining whether to move a packet flow from one path to another), and one of TOR switches 106 (FIGS. 1A and 1B) may perform the actual packet reception and forwarding aspects of the method of FIG. 6.

In this example, network device 200 receives a first packet of a packet flow (250). In this example, it is assumed that this first packet is the ordinal first packet flow, e.g., a synchronization (SYN) packet of the packet flow. Network device 200 receives the packet via flow control unit 222. Flow control unit 222 provides the packet to splicing unit 212, which determines that the packet is of a new packet flow. Thus, splicing unit 212 determines a path through a network topology that has a low utilization (252). For example, splicing unit 212 may determine a path with a relatively low load and/or low queue depth.

Splicing unit 212 then assigns the packet flow to the determined path (254). That is, splicing unit 212 stores identifying information for the packet flow in hash table 218, along with an indication of the path to which the packet flow is assigned and a timestamp representing a time at which the packet was received. Splicing unit 212 stores this information in a bucket identified by hash function unit 216. Hash function unit 216 accepts identifying information for the packet flow (and, possibly, a fabric bundle identifier) as input and executes on this input to identify the bucket.

After forwarding the packet, network device 200 receives a subsequent packet of the packet flow (258). Again, flow control unit 222 forwards the packet to splicing unit 212. Splicing unit 212 determines whether there is a different path with lower utilization (lower load and/or depth queue) (260). If not ("NO" branch of 260), network device 200 forwards the packet along the current path (262). Furthermore, splicing unit 212 updates the timestamp value in the bucket of hash table 218 corresponding to the packet flow. However, if there is a different path with lower utilization ("YES" branch of 260), network device 200 determines a latency skew, representing a latency difference between the current path and the other path with lower utilization (264).

As discussed above, network device 200 may determine latencies and/or latency skew in various ways. For example, an administrator may provide configuration data to network device 200 that defines the latencies and/or latency skews between various paths to network device 200. As another example, virtual network controller 112 may provide such configuration data to network device 200. As still another example, network device 200 may receive data from other devices of the interconnected topology to which network device 200 is connected and calculate latencies for the various paths from this data. For instance, network device 200 may add timestamps to packets representing when the packets were sent through the interconnected topologies, and receive data from egress devices of the interconnected topology, then calculate the latencies as differences between these timestamp values. Alternatively, virtual network controller 112 may receive this data to calculate the latencies of the various paths and/or to calculate the latency skews.

In any case, network device 200 may determine whether an inactivity interval is greater than the latency skew (266). The inactivity interval represents a period of time between the most recent previous packet and the current packet. Splicing unit 212 determines the inactivity interval by subtracting a current time from the timestamp value stored in the bucket of hash table 218 for the packet flow. Packet reordering can be avoided if the inactivity interval is greater than the latency skew because the most recent previous packet will arrive at its destination before the current packet. Accordingly, if the inactivity interval is less than the latency skew ("NO" branch of 266), network device 200 forwards the packet along the current path (262).

However, if the inactivity interval is greater than the latency skew ("YES" branch of 266), network device 200 re-assigns the packet flow to the new path (268). That is, splicing unit 212 updates the information of the bucket of hash table 218 corresponding to the packet flow to indicate the new path, as well as updating the timestamp. Then network device 200 forwards the packet along the new path (270).

In this manner, the method of FIG. 6 represents an example of a method including forwarding, by a network device comprising a leaf node of an interconnected topology having a plurality of paths from the network device to each of a plurality of other leaf nodes of the interconnected topology, a first packet of a packet flow along a first network path of the plurality of paths. The method also includes, in response to receiving a second packet of the packet flow, determining, by the network device, an inactivity interval for the packet flow that represents an amount of time between receipt of the first packet and receipt of the second packet by the network device during which no other packets were received for the packet flow. The method further includes comparing the inactivity interval to a threshold, wherein the threshold is configured based on a latency difference (that is, a latency skew) between the first network path and the second network path. The method also includes, when the inactivity interval is greater than the threshold, forwarding the second packet along a second network path of the plurality of paths, wherein the second network path is different than the first network path.

Figure 7:
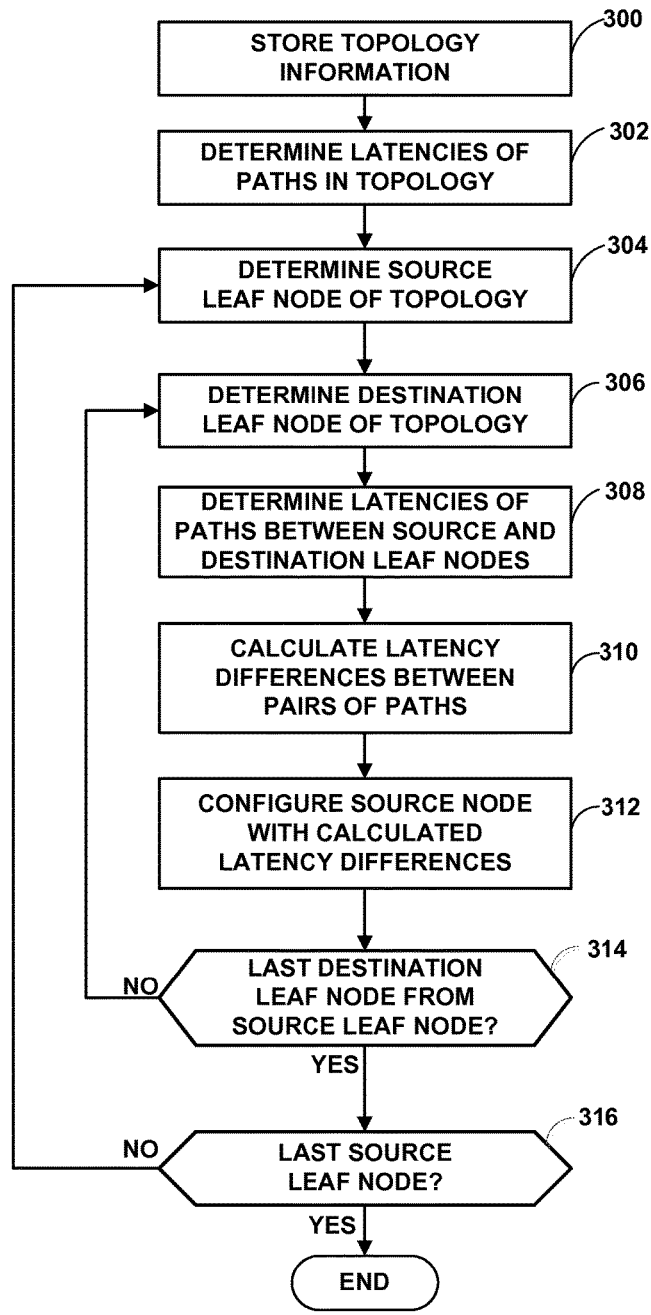
FIG. 7 is a flowchart illustrating an example method by which a controller configures network devices with thresholds used to determine whether to migrate a packet flow from one path to another.

FIG. 7 is a flowchart illustrating an example method by which a controller, such as virtual network controller 112, configures network devices with thresholds used to determine whether to migrate a packet flow from one path to another. In particular, the thresholds represent latency differences between a pair of paths of a plurality of paths between a source node and an endpoint node in an interconnected topology, such as interconnected topology 118 of FIGS. 1A and 1B. In some examples, the method of FIG. 7 may be performed by an SDN controller of an SDN. Again, as explained above, virtual network controller 112 may be configured as an SDN controller. For purposes of example, the method of FIG. 7 is explained with respect to virtual network controller 112, although it should be understood that other devices may be configured to perform the techniques of FIG. 7.

Initially, virtual network controller 112 stores topology information representative of interconnected topology 118 (300). The topology information represents, for example, paths between various leaf nodes (e.g., TOR switches 106), including a number of paths between each of the leaf nodes. Virtual network controller 112 also determines latencies of paths in the interconnected topology (302). It should be understood that although FIG. 7 shows this as a discrete step, virtual network controller 112 may periodically reevaluate latencies of paths, and thus, this process may be ongoing. To determine the latencies, virtual network controller 112 may receive timestamps from the leaf nodes of the interconnected topology indicating times when packets were sent and received, as well as information indicating which paths the packets were sent over.

Next, virtual network controller 112 determines one of the leaf nodes as a source leaf node of the topology (304). Virtual network controller 112 also determines another one of the leaf nodes as a destination leaf node of the topology (306). As discussed below, virtual network controller 112 iterates through each of the leaf nodes and treats each as a source leaf node during the iteration, and iterates through the remaining leaf nodes and treats each as a destination leaf node.

For a given source and destination leaf node, virtual network controller 112 determines latencies of paths between the source and destination leaf nodes (308). More particularly, the interconnected topology includes a plurality of paths between any given source leaf node and destination leaf node. Thus, virtual network controller 112 determines latencies of each of these paths.

Moreover, virtual network controller 112 calculates latency differences (that is, latency skews) between each pair of paths in the plurality of paths from the source leaf node to the destination leaf node (310). In the example of FIGS. 1A and 1B, there are N choose 2 pairs of paths from each source node to each destination node, where N is equal to the number of chassis switches 104 included in interconnected topology 118. Virtual network controller 112 determines latency differences for each of these pairs. Furthermore, virtual network controller 112 configures the source node with the calculated latency differences (312), to be used as thresholds when determining whether to migrate a packet flow from one of the paths of the pair to the other. For example, virtual network controller 112 may output the configuration data according to an SDN protocol.

As noted above, virtual network controller 112 iterates through each leaf node as a destination leaf node for a particular source leaf node, and each leaf node as a source leaf node. Thus, after calculating latency differences for a given pair of leaf nodes as source and destination leaf nodes, virtual network controller 112 determines whether the destination leaf node is the last possible destination leaf node of the plurality of leaf nodes from the source leaf node (314). If not ("NO" branch of 314), virtual network controller 112 repeats steps 306-312, selecting a different destination leaf node in step 306. If all possible leaf nodes have been analyzed as destination leaf nodes for the source leaf node ("YES" branch of 314), virtual network controller 112 determines whether the source leaf node was the last source leaf node of the plurality of leaf nodes (316). If not ("NO" branch of 316), virtual network controller repeats steps 304-314, selecting a different leaf node as the source leaf node. Otherwise ("YES" branch of 316), virtual network controller 112 ends this process.

In this manner, the method of FIG. 7 represents an example of a method including storing, with a controller of a data center, respective topology information for a plurality of leaf node switches interconnected within the data center by one or more centralized switches to form a plurality of paths from each of the leaf node switches to each of the other leaf node switches, for each of the leaf node switches: identifying pairwise permutations of the plurality of paths for which a first path and a second path both originate from the leaf node switches and lead to other ones of the leaf node switches, computing, with the controller and for each of the pairwise permutations, a respective threshold for an inactivity interval for controlling reassignment of a packet flow from the first path to the second path of the pairwise permutation, wherein the threshold is calculated based on a latency difference between the first path and the second path of the pairwise permutation, and outputting configuration information to the respective leaf node, the configuration information specifying the thresholds computed by the controller for each of the pairwise permutation of the paths originating from the leaf node.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
forwarding, by a network device comprising a first leaf node of an interconnected topology having a plurality of network paths from the network device to each of a plurality of other leaf nodes of the interconnected topology, a first packet of a packet flow along a first network path of the plurality of network paths to a second leaf node of the plurality of other leaf nodes of the interconnected topology, wherein the interconnected topology comprises a plurality of non-leaf nodes, the first leaf node, the other leaf nodes, and network paths between each of the first leaf node and the other leaf nodes via each of the non-leaf nodes;
in response to receiving a second packet of the packet flow, determining, by the network device, an inactivity interval for the packet flow that represents an amount of time between receipt of the first packet and receipt of the second packet by the network device during which no other packets were received for the packet flow;
calculating, by the network device, a threshold as a latency difference between a latency for the first network path and a latency for a second, different network path of the plurality of network paths to the second leaf node;
comparing, by the network device, the inactivity interval to the threshold; and
when the inactivity interval is greater than the threshold, forwarding, by the network device, the second packet along the second network path of the plurality of network paths to the second leaf node.

2. The method of claim 1, further comprising,
prior to calculating the threshold:
adding, by the network device, timestamps to packets sent along the first network path and the second network path; and
receiving, from leaf nodes of the interconnected topology along the first network path and the second network path, data representing differences between the timestamps and times of receipt of the packets,
wherein calculating comprises calculating the latency of the first network path and the latency of the second network path based on the differences.

3. The method of claim 1,
wherein the network device comprises a switch of a software defined network (SDN) managed by an SDN controller of the SDN,
the method further comprising:
reporting packet send times and packet receive times from the network device to the SDN controller.

4. The method of claim 1, wherein the interconnected topology comprises one of a spine and leaf topology, a virtual chassis fabric (VCF), an Internet protocol (IP) Fabric, and a network according to IEEE 802.1BR.

5. The method of claim 1, further comprising, when the inactivity interval is less than the threshold, forwarding the second packet along the first network path.

6. The method of claim 1, further comprising forwarding the second packet along the second network path when the inactivity interval is greater than the threshold and when utilization of the second network path is less than utilization of the first network path.

7. The method of claim 1, wherein the packet flow comprises a plurality of packets having a common source Internet protocol (IP) address, a common destination IP address, a common source port, a common destination port, and a common network protocol.

8. The method of claim 1, wherein the interconnected topology defines the plurality of non-leaf nodes including a first non-leaf node and a second non-leaf node, each of the non-leaf nodes being coupled to each of the leaf nodes of the interconnected topology, the first non-leaf node being different than the second non-leaf node,
wherein forwarding the first packet comprises forwarding the first packet via the first non-leaf node, and
wherein forwarding the second packet comprises forwarding the second packet via the second non-leaf node.

9. The method of claim 1, wherein the network device comprises a top-of-rack (TOR) switch of a data center, wherein the other leaf nodes comprise respective TOR switches of the data center, and wherein each of the TOR switches is communicatively coupled to one or more respective servers of the data center.

10. The method of claim 1, further comprising:
executing a hash function on data of the first packet representing the packet flow to identify a bucket in a hash table corresponding to the packet flow; and
storing a timestamp value representing the time of receipt of the first packet to the bucket,
wherein determining the inactivity interval comprises:
executing the hash function on data of the second packet representing the packet flow to identify the bucket; and
calculating a difference between the time of receipt of the second packet and the timestamp value of the bucket.

11. The method of claim 10, further comprising determining a fabric bundle identifier for an interface of the network device coupled to a link along the first network path, the fabric bundle identifier corresponding to a set of hash buckets in the hash table allocated to the fabric bundle identifier, wherein executing the hash function further comprises using the fabric bundle identifier to determine the set of hash buckets, the set of hash buckets including the bucket corresponding to the packet flow.

12. The method of claim 1, further comprising selecting the second network path when the second network path has a link load and queue depth that is lower than a link load and queue depth than the first network path.

13. The method of claim 1, further comprising determining the second path, comprising:
calculating moving averages for link loads of links along the plurality of network paths from the network device;
determining a lowest moving average of the calculated moving averages; and
selecting the second path as corresponding to the determined lowest moving average.

14. A network device configured as a first leaf node of an interconnected topology having a plurality of network paths from the network device to each of a plurality of other leaf nodes of the interconnected topology, wherein the interconnected topology comprises a plurality of non-leaf nodes, the first leaf node, the other leaf nodes, and network paths between each of the first leaf node and the other leaf nodes via each of the non-leaf nodes, the network device comprising:
a plurality of physical ports each coupled to a respective one of the plurality of network paths; and
one or more processing units configured to:
forward a first packet of a packet flow along a first network path of the plurality of network paths via a respective one of the physical ports to a second leaf node of the plurality of other leaf nodes of the interconnected topology, in response to receiving a second packet of the packet flow, determine an inactivity interval for the packet flow that represents an amount of time between receipt of the first packet and receipt of the second packet by the network device during which no other packets were received for the packet flow, calculate a threshold as a latency difference between a latency for the first network path and a latency for a second, different network path of the plurality of network paths to the second leaf node, compare the inactivity interval to the threshold, and when the inactivity interval is greater than the threshold, forward the second packet along the second network path of the plurality of network paths via a respective one of the physical ports to the second leaf node.

15. The network device of claim 14, wherein the network device comprises a switch of a software defined network (SDN) managed by an SDN controller of the SDN.

16. The network device of claim 14, wherein the interconnected topology comprises one of a spine and leaf topology, a virtual chassis fabric (VCF), an Internet protocol (IP) Fabric, and a network according to IEEE 802.1BR.

17. The network device of claim 14, wherein the processing units are configured to forward the second packet via the respective one of the ports of the first network path when the inactivity interval is less than the threshold.

18. A system comprising:
a plurality of network devices comprising a plurality of leaf nodes and a plurality of non-leaf nodes arranged according to an interconnected topology that defines a plurality of network paths between the network devices such that each of the leaf nodes is connected to each of the other leaf nodes via each of the non-leaf nodes though network paths; and a virtual network controller to provide configuration to the network devices, wherein one of the network devices comprising a first leaf node of the plurality of leaf nodes is configured to:
forward a first packet of a packet flow along a first network path of the plurality of network paths to a second leaf node of the plurality of leaf nodes of the interconnected topology, after receiving a second packet of the packet flow, determine an inactivity interval for the packet flow that represents an amount of time between receipt of the first packet and receipt of the second packet during which no other packets were received for the packet flow, calculate a threshold as a latency difference between a latency for the first network path and a latency for a second, different network path of the plurality of network paths to the second leaf node, compare the inactivity interval to the threshold, and when the inactivity interval is greater than the threshold, forward the second packet along the second network path of the plurality of network paths to the second leaf node.

19. The system of claim 18, wherein the configuration data provided by the virtual network controller defines latency skews between the network paths.

20. The system of claim 18, wherein the interconnected topology comprises one of a spine and leaf topology, a virtual chassis fabric (VCF), an Internet protocol (IP) Fabric, and a network according to IEEE 802.1BR.

21. A computer-readable storage medium comprising instructions that, when executed, cause a processor of a network device comprising a first leaf node of an interconnected topology comprising a plurality of leaf nodes including the first leaf node and a plurality of non-leaf nodes and that defines a plurality of network paths between each of leaf nodes via each of the non-leaf nodes of the interconnected topology to:
forward a first packet of a packet flow along a first network path of the plurality of network paths to a second leaf node of the plurality of leaf nodes of the interconnected topology;

after receiving a second packet of the packet flow, determine an inactivity interval for the packet flow that represents an amount of time between receipt of the first packet and receipt of the second packet during which no other packets were received for the packet flow;

calculate a threshold as a latency difference between a latency for the first network path and a latency for a second, different network path of the plurality of network paths to the second leaf node;

compare the inactivity interval to the threshold; and when the inactivity interval is greater than the threshold, forward the second packet along the second network path of the plurality of network paths to the second leaf node.

22. A method comprising:
storing, with a controller of a data center, respective topology information for a plurality of leaf node switches interconnected within the data center by one or more centralized switches, the centralized switches comprising non-leaf nodes, to form a plurality of network paths from each of the leaf node switches to each of the other leaf node switches via each of the non-leaf nodes;

for each of the leaf node switches,
identifying pairwise permutations of the plurality of paths for which a first path and a second path both originate from the leaf node switches and lead to other ones of the leaf node switches;

computing, with the controller and for each of the pairwise permutations, a respective threshold for an inactivity interval for controlling reassignment of a packet flow from the first path to the second path of the pairwise permutation, wherein the threshold is calculated based on a latency difference between the first path and the second path of the pairwise permutation; and outputting configuration information to the respective leaf node switch, the configuration information specifying the thresholds computed by the controller for each of the pairwise permutation of the paths originating from the leaf node switch.

23. The method of claim 22, further comprising:
receiving, with the controller and from each of the leaf node switches, timestamp information indicating packet send time for packets were sent by the leaf node switches and packet receive time for packets received by the leaf node switches; and computing the respective thresholds for each of the pairwise permutations of paths based on the packet send times, the packet receive times, and the topology information.

24. The method of claim 22,
wherein the controller comprises a software defined networking (SDN) controller, and
wherein outputting configuration information comprises outputting the configuration information using an SDN protocol.

\* \* \* \* \*